United States Patent [19]

Allen

[11] 4,309,054

[45] Jan. 5, 1982

[54] WALL STAKES FOR VEHICLE SIDEWALL PANELING

[76] Inventor: John D. Allen, 10302 S. 144th St., Omaha, Nebr. 68138

[21] Appl. No.: 168,089

[22] Filed: Jul. 14, 1980

[51] Int. Cl.³ .............................................. B62D 25/02
[52] U.S. Cl. ........................................ 296/36; 296/43; 105/378
[58] Field of Search .................... 296/43, 36, 181, 104; 105/378, 386

[56] References Cited

U.S. PATENT DOCUMENTS

| | | | |
|---|---|---|---|
| 3,692,354 | 9/1972 | Tuerk | 296/43 |
| 3,794,375 | 2/1974 | Woodward | 296/43 |
| 3,811,724 | 5/1974 | Woodward | 296/36 |
| 3,871,702 | 3/1975 | Glassmeyer | 296/36 |
| 4,089,555 | 5/1978 | Allen | 296/43 |

Primary Examiner—Robert R. Song
Attorney, Agent, or Firm—George R. Nimmer

[57] ABSTRACT

Disclosed are wall stake structures adaptable for removably implanting into flat bed trailer and truck vehicles provided with a plurality of depending pockets; laterally extending sidewall paneling is supported by the upright wall stakes. Each wall stake comprises in dovetailed relationship: an implantable upright tubular primary member; and an upright secondary member cross-sectionally unitarily including a winged web, a transversely extending vertical-plate, and vertical guide-plates extending laterally in both directions from the vertical-plate. The laterally extending vehicle sidewall paneling is supported between the front-wall of the primary tubular member and the guide-plates of the secondary member. The secondary member at the winged web is tightly slidably surrounded by the post member to both strengthen the tubular post member and to define in conjunction therewith a vertical header bore to receive an end of a topbow canopy support. Alternate embodiments are described appropriate for supporting the upright terminal ends of two neighboring panels, for supporting an intermediate vertical notch of the same panel, for receiving a range of topbow and paneling cross-sectional sizes, and for meeting other exigiencies commonly confronting the drayman.

12 Claims, 9 Drawing Figures

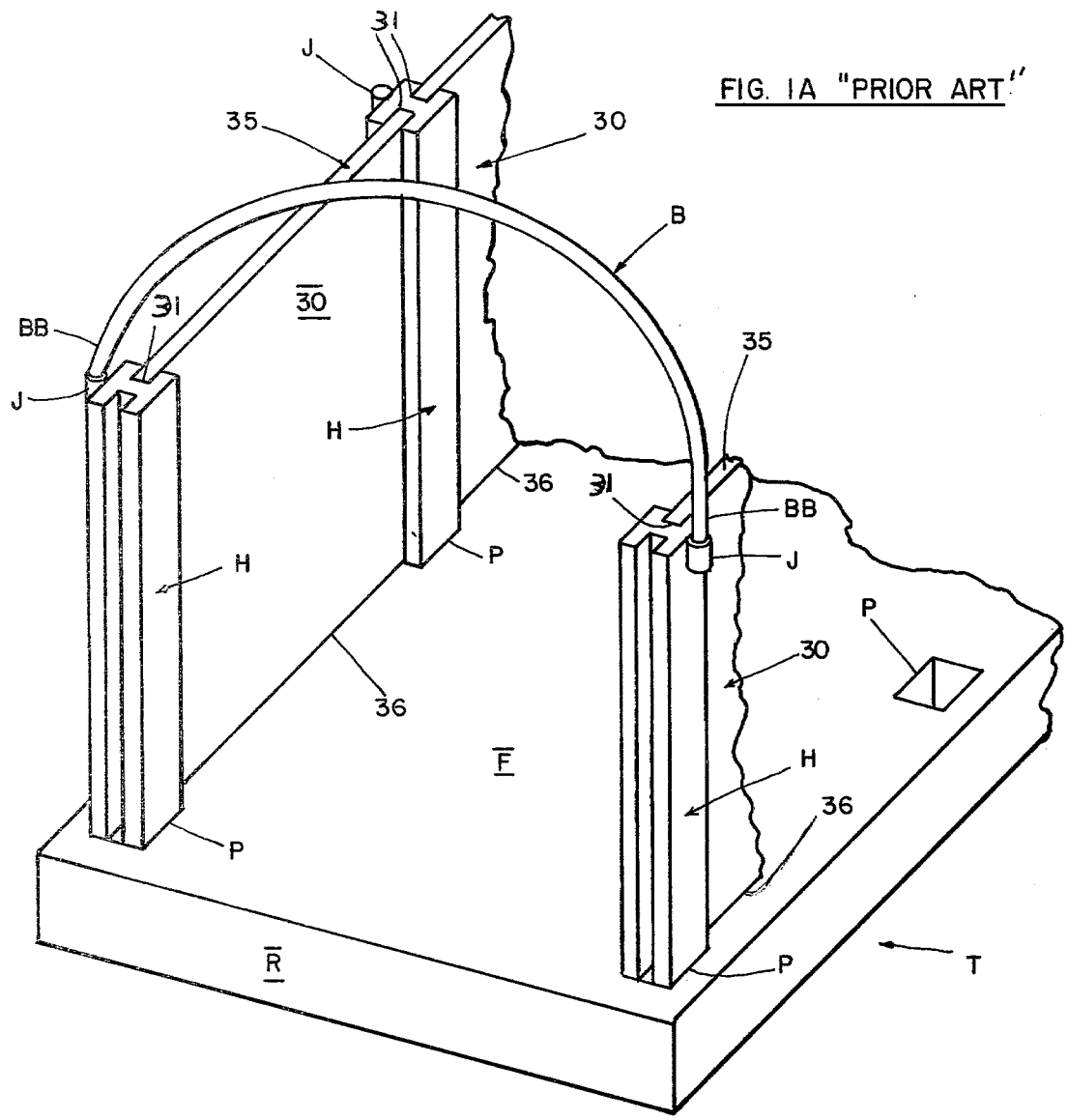
FIG. 1A "PRIOR ART"
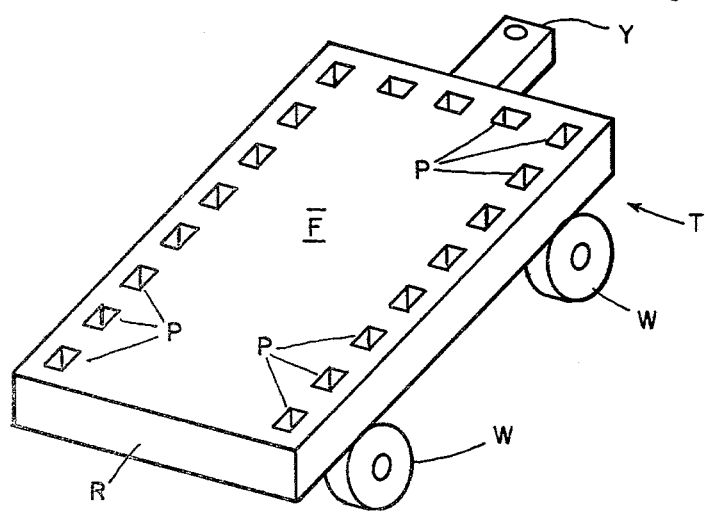
FIG. 1 "PRIOR ART"

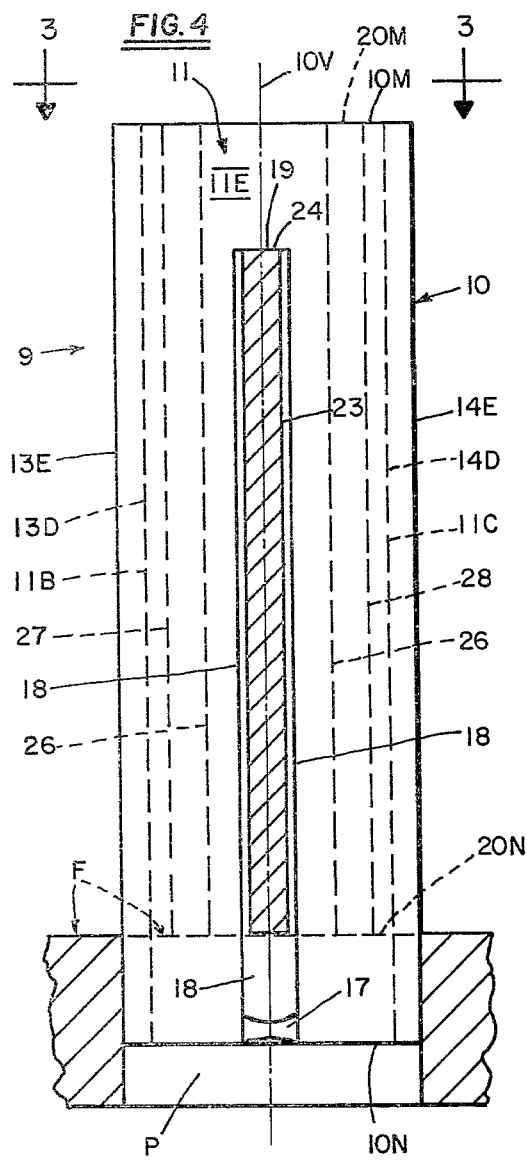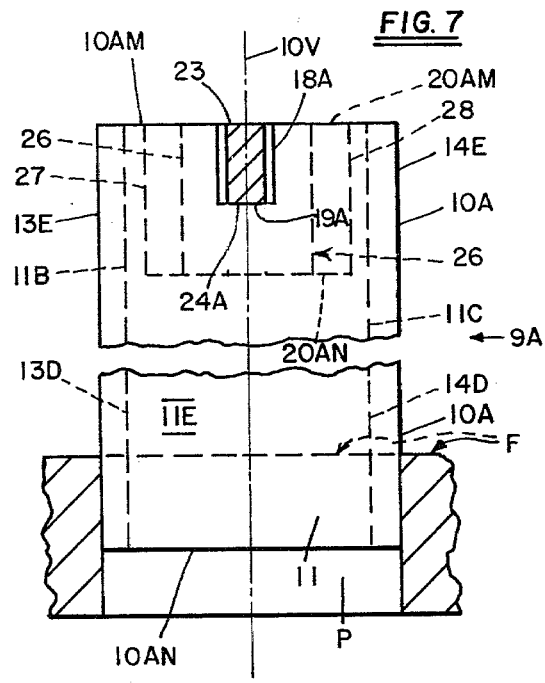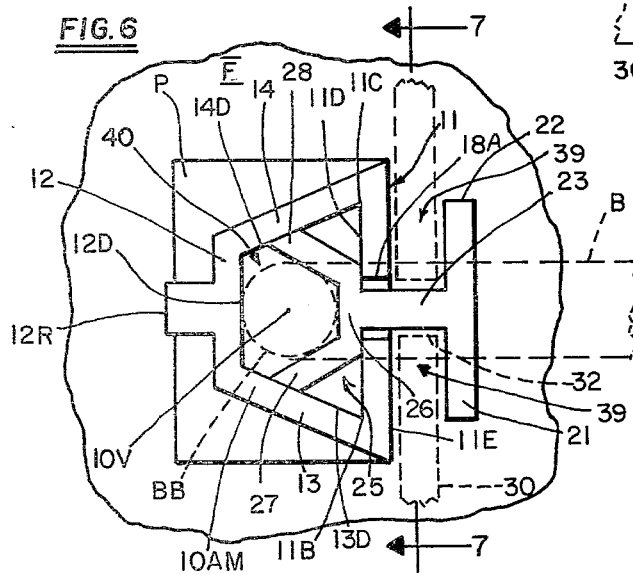

WALL STAKES FOR VEHICLE SIDEWALL PANELING

Overland drayage vehicles of the flat bed type commonly include a plurality of depending pockets along the truck or trailer sides. Occasionally, depending upon the type of cargo to be hauled, such pocketed flat bed vehicles are provided with temporary sidewalls comprising metallic stakes uprightly removably inserted into the flat bed pockets and elongate upright sidewall paneling (usually of plywood material) being uprightly removably supported by the intervening wall stakes. Among the prior art metallic wall stakes are those described in U.S. Pat. Nos. 3,126,224, 3,692,354, 3,794,375, and 3,871,702.

It is desireable that metallic wall stakes for vehicular sidewall paneling ideally should satisfy the following requirements. Not only must the stake be able to securely support the upright paneling to secure the cargo, it also must be sufficiently structurally strong to withstand transversely shifting cargo without fracturing, distorting beyond economical repair, or jamming into or falling through the vehicle pockets. The stake must be of extrudable metal and amenable to various cross-sectional sizes of vehicle pockets, sidewall paneling, and canopy supporting topbows. Stake weight should be minimized (yet without unduly detracting from structural strength) with a view to achieving resiliency, reliable performance, easy maintenance, and economic manufacture of the wall stake. In a related vein, repair and maintenance of the wall stakes should be relatively simple and economical to perform. However, these ideal criteria and requirements (some of which are seemingly contradictory) have eluded prior art workers in the wall stakes realm of the transportation industry.

It is accordingly the the general objective of the present invention to provide improved metallic wall stakes for flat bed vehicles sidewall paneling which overcomes the disadvantages and deficiencies of prior art wall stakes.

With the above and other objects and advantages in view, which will become more apparent as this description proceeds, the vehicular wall stake structures of the present invention generally comprise in dovetailed relationship; an implantable upright tubular member; and an upright secondary member cross-sectionally unitarily including a winged web, a transversely extending vertical-plate, and vertical guide-plates extending in both lateral directions from the vertical-plate, the winged web being tightly surrounded by the primary post member to both strengthen same and to define in conjunction therewith a header bore to receive one end of a topbow canopy support, together with desireable optional features alluded to in the accompanying drawings.

In the drawing, wherein like characters refer to like parts in the several views, and in which;

FIG. 1 is a perspective view of a typical flat bed vehicle having depending pockets and providing a typical environment for the novel wall stake structures of the present invention;

FIG. 1A is a typical prior art wall stake construction employed in the FIG. 1 vehicular environment;

FIG. 4 is a laterally extending sectional elevational view taken along lines 4—4 of FIGS. 2 and 3;

FIG. 6 is a top plan view of the second embodiment;

FIG. 7 is a laterally extending sectional elevational view taken along lines 7—7 of FIGS. 5 and 6;

FIG. 8 is a top plan view showing the addition of a tubular-sleeve adapter.

Referring initially to FIGS. 1 and 1A which typify prior art relative upright wall stakes for supporting vehicular sidewall paneling. A typical flat bed pocketed vehicle might take the form of trailer "T" having wheels "W", drawbar "Y", and bed with cargo bearing horizontal surface "F" rearwardly terminating at "R". Incrementally spaced along the sides of flat bed "F", and customarily of two-feet intervals, are depending pockets "P". The typical prior art wall stake "H" depicted in FIG. 1A is of extruded metal having a uniform H-shaped cross-section to provide two upright channels for the upright terminii 31 of removably supported sidewall paneling 30. The upper and lower laterally extending horizontal terminii of paneling 30 are respectively indicated as 35 and 36, the latter at surface "F". The lower end foot part of wall stake "H" is removably inserted into vehicle pocket "P"; the upper portion is provided with an offset tubular seat "J" for supporting the depending lower end "BB" of the transversely extending topbow "B" which in turn supports a canopy (not shown).

Figure 2:
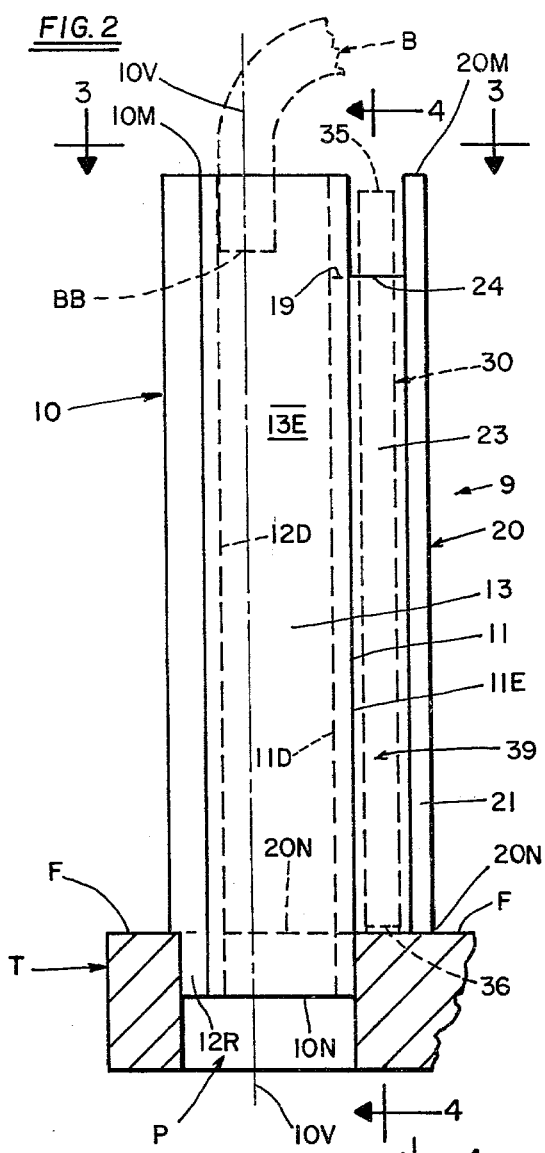
FIG. 2 is a left side elevational view of a first embodiment "9" of the wall stake of the present invention, the right side elevational view (not shown) being a mirror image thereof.
Figure 5:
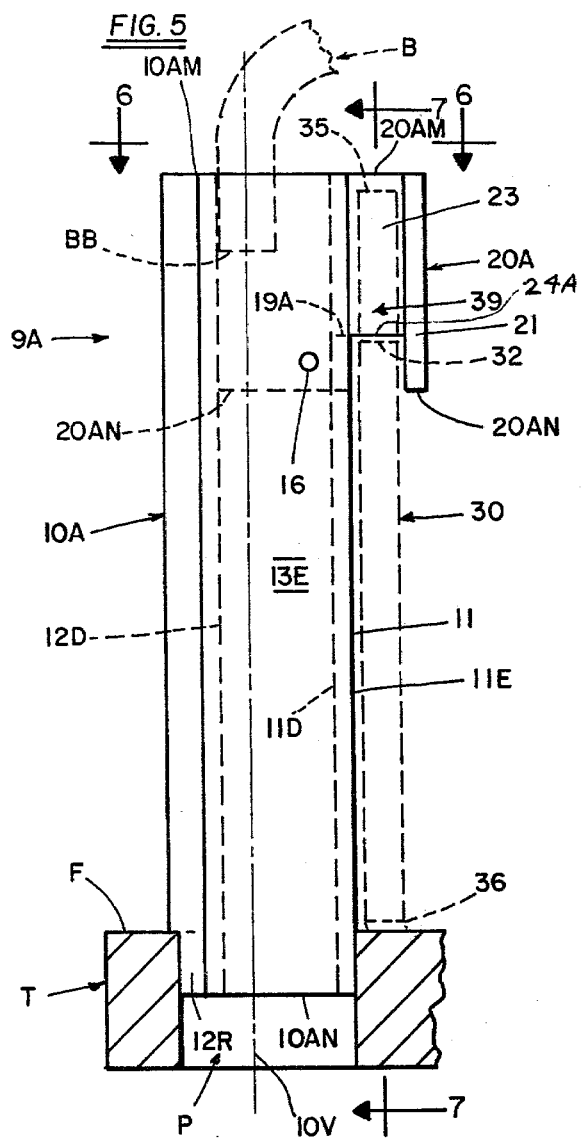
FIG. 5 is a left side elevational view of a second embodiment "9A" of the wall stake of the present invention, the right side elevational view (not shown) being a mirror image thereof.
Figure 3:
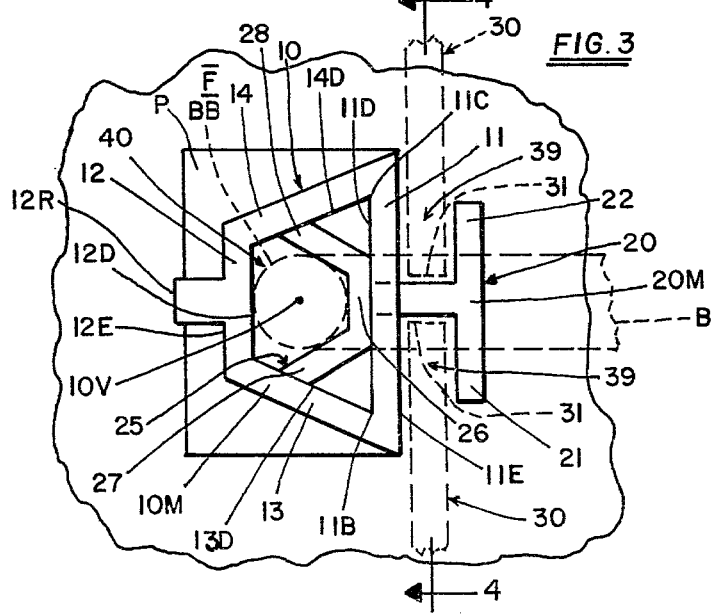
FIG. 3 is a top plan view of the first embodiment.

As previously indicated, the wall stake embodiment of FIGS. 2-4 will be referred to as "9" while the wall stake embodiment of FIGS. 5-7 will be referred to as "9A". However, the primary post member 10 of embodiment 9 differs from the primary post member 10A of embodiment 9A only at the length and positioning of the front-wall 11 vertical slot i.e. slot 18 for post 10 and slot 18A for post 10A. The secondary member 20 of embodiment 9 differs from the secondary member 20A of embodiment 9A primarily at the selected finite-height i.e. 20M-20N of member 20 and 20AM-20AN of member 20A, and its relationship to the post bottom-end i.e. 10N, 10AN. As will be explained later in greater detail, wall stake embodiment 9 is employed for supporting the upright ends 31 of two neighboring panels 30, while embodiment 9A is employed for supporting a single panel 30 at an intermediate vertical notch 32.

Referring now to FIGS. 2-4 depicting wall stake embodiment 9, which comprises primary post member 10 in slidably associated dovetailed relationship with secondary member 20. Primary member 10 takes the form of a vertical tubular post extending along a vertical-axis 10V for a finite-extent 10M-10N from header top-end 10M to foot bottom-end 10N. The post member foot is removably implantably inserted into a vehicle depending pocket "P" whereby post bottom-end 10N is located below cargo bearing surface "F". Post member 10 has vertically extending connected walls 11-14, the front-wall 11 having a laterally extending outer-face 11E substantially parallel to and transversely forwardly separated from its inner-face 11D. Post 10 has an upright external-contour 11E-14E surrounding vertical-axis 10V and also surrounding post internal-contour 11D-14D, said external-contour being provided by front-wall outer-face 11E in combination with faces 12E, 13E, and 14E. Upright internal-contour 11D-14D is of constant cross-sectional size and geometric shape along and surrounding vertical-axis 10V, said internal-contour being provided by front-wall inner-face 11D in conjunction with rear-wall inward-face 12D and the two inside-faces 13D and 14D. Primary post member 10 preferably has a non-rectangular cross-sectional shape which is particularly evident and necessary at internal-contour 11D-14D. Specifically, the internal-contour commencing at the laterally separated upright ends 11B and 11C of front-wall inner-face 11D is transversely rearwardly convergent e.g. convergent inside-faces 13D and 14D of walls 13 and 14, respectively. In this vein, the lateral extent of rear-wall planar inward-face 12D is narrower than the lateral extent of front-wall planar inner-face 11D.

Less than the entire finite-extent 10M-10N of the post member front-wall 11 and commencing at a single end only is provided with a vertically extending slotted length 18 located substantially midway the front-wall internal upright ends 11B and 11C. The terminal end 19 of slot 18 is in elevation located between post ends 10M and 10N and nearer to top-end 10M than to bottom-end 10N, and, for purposes to be explained, the slot horizontal end 19 might be termed the slot abutment-terminus. For post 10 of embodiment 9, front-wall slot 18 commences at bottom-end 10N and extends for the majority of finite-extent 10M-10N.

Vehicle depending pockets "P" occur within a range of cross-sectional sizes. So that the external-contour at the post member foot (10N, 10AN) might be adapted to fit within a range of pocket "P" sizes, post member rear-wall 12 includes a laterally narrow rearward protuberance 12R. Protuberance 12R extends as a vertical rib to at least the post bottom-end (10N, 10AN) and can be mechanically shaved, whittled, or otherwise reduced in cross-sectional size toward inward-surface 12D whereby the post member is implantable into relatively small vehicular pockets "P".

Secondary member 20 of wall stake embodiment 9 provides in conjunction with post front-wall 11 a pair of upright and laterally extending paneling channels 39 located on opposite sides of front-wall slot 18 and also internal bracing to strengthen the post member. The secondary member 20 extends parallel vertical-axis 10V for a finite-height 20M-20N for an upper-end 20M to a lower-end 20N, said finite-height 20M-20N being less than the primary member finite-extent 10M-10N. The secondary member along the major proportion of its finite-height 20M-20N has a uniform cross-sectional size and shape including; a web 25 surrounded by post internal-contour 11D-14D, a vertical-plate 23 extending transversely through post front-wall slot 18, and substantially co-planar guide-plates 21 and 22 cooperating with front-wall outer-face 11E and vertical-plate 23 to form two paneling channels 39.

Vertical-plate 23, at least at its direct intersection with post front-wall 11, has a recessed horizontal lead-end 24 whereby the vertical-plate 23 thereat has an arrested-height less than the secondary member finite-height 20M-20N. The vertical-plate horizontal lead-end 24 and the front-wall horizontal abutment-terminus 19 are of substantial co-elevation and preferably in directly abutting relationship. In order to ensure desireably substantial parallelism between uniplanar guide-plates 21-22 with transversely spaced front-wall outer-face 11E, and nonrotatability of web 25, the lateral widths of vertical-plate 23 and slot 18 are preferably equal for slidable engagement. For wall stake embodiment 9, the secondary member lower-end 20N is deeply below abutment-terminus 19 and abuts downwardly against vehicle surface "F" and the vertical-plate lead-end 24 abuts upwardly against slot abutment-terminous 19 thereby providing a post uplifting means to prevent its falling downwardly through vehicle pocket "P".

The web portion e.g. 25, of the secondary member 20 is slidably received by the post member internal-contour and thereby internally braces and structurally strengthens the primary post member whereby the wall stake is more resistant to stresses from transversely shifting cargo. In this vein, there are desireably anti-spreading means for the slotted (18) post member, such as a weld 17 spanning slot 18 adjacent the commencement thereof at post bottom-end 10N. In addition to bracing purposes, the secondary member web defines the cross-sectional major proportion of a header bore 40 adapted to receive an end "BB" of a canopy supporting topbow "B". Web style 25 cross-sectionally includes a laterally extending frontal-part 26 slidably engaged with the front-plate inner-face 11D on both sides of vertical slot 18. Web 25 also cross-sectionally includes two wing-parts 27 and 28 diverging rearwardly from frontal-part 26 and slidably engaging the respective convergent inside-faces 13D and 14D. Preferably, wing-parts 27 and 28 are spaced remotely from rear-wall inward-face 12D whereby header bore 40 is cross-sectionally defined by the two wing-parts 27 and 28, web frontal-part 26, and the preferably planar inward-face 12D of rear-wall 12.

Referring now to FIGS. 5-7 depicting wall stake embodiment 9A. As previously alluded to, primary member 10A for embodiment 9A differs from primary member 10 of embodiment 9 only at the length and positioning of the front-wall vertical slot. Specifically, for post embodiment 10A, slot 18A commences at top-end 10AM (rather than from bottom-end 10N) and extends for only a minor proportion of finite-extent 10AM-10AN. Secondary member 20A of embodiment 9A has a finite-height 20AM-20AN bearing a drastically lesser ratio to finite-extent 10AM-10AN than is the ratio of 20M-20N to 10M-10N in embodiment 9. Also, with the secondary member 20A of the embodiment 9A, the vertical-plate lead-end 24A abuts downwardly against the slot abutment-terminus 19A. The lower-end 20AN is located below said abutment-terminus 19A, but nearer to 19A and 24A than to the post bottom-end 10AN. The vertical distance from 20AM to 24A is roughly equivalent to the height of paneling notch 32. For the uplifting means, there are stop means to maintain the secondary member lower-end 20AN above the post member bottom-end 10AN, such as a pin 16 passing through post wall 13 and entering into web 25.

FIG. 8 depicts a tubular-sleeve adapter 50 concentrically surrounding vertical-axis 10V and removably secured within header bore 40, whereby the inside diameter of sleeve 50 might be empirically selected for topbow ends ("BB") of smaller sizes.

Structural materials preferred for the primary and secondary members are metallic materials extruded or otherwise formed into appropriate cross-sectional shapes and cut to appropriate lengths. For example, aluminum material extruded into the cross-sectional shapes depicted in FIGS. 3 and 6 is desireable and can be readily cut into the selected lengths 10M-10N, 20M-20N, 10AM-10AN, 20AM-20AN.

From the foregoing, the construction and operation of the wall stakes for vehicular sidewall paneling of the present invention will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. A wall stake adaptable for removable insertion into a flat bed vehicle provided with a plurality of depending pockets, said wall stake being adaptable for supporting upright and laterally extending vehicle sidewall paneling and comprising primary and secondary upright members in slidably associated dovetailed relationship;

A. said primary member being a tubular post extending downwardly along a vertical-axis for a finite-extent from a header at the post top-end to a foot at the post bottom-end and which foot is removably implantable into a vehicle depending pocket, the tubular shape of said post being partially provided by a vertical front-wall having a laterally extending outer-face substantially parallel to and transversely separated from the front-wall inner-face, said tubular post primary member having an upright external-contour surrounding the vertical-axis and that is partially provided by the front-wall outer-face and having an upright internal-contour, the upright internal-contour being of constant cross-sectional geometric shape and size surrounding said vertical-axis, a portion of the internal-contour being provided by the front-wall laterally extending inner-face, said internal-contour commencing at the laterally separated ends of the front-wall upright inner-face being transversely rearwardly convergent of the front-wall, less than the entire finite-extent of the front-wall and commencing at a single end only being provided with a vertically extending slotted length located substantially midway the front-wall upright ends, said slotted length providing a horizontal front-wall abutment-terminus located between the primary member top-end and bottom-end;

B. said dovetailed slidably associated secondary member providing a pair of upright and laterally extending paneling channels located on opposite sides of the post member slotted length and also internally bracing to strengthen the post member, said secondary member extending along said vertical-axis and having from upper-end to lower-end a finite-height, said secondary member having along the major proportion of the finite-height a uniform cross-sectional shape including:

i. a vertical-plate extending transversely through the post member front-wall vertically slotted length, the vertical-plate having a recessed lead-end whereby the vertical-plate has an arrested-height less than the finite-height, the vertical-plate horizontal lead-end and the front-wall abutment-terminus being of substantial co-elevation, ii. a pair of substantially co-planar guide-plates extending in opposite lateral directions from the attached vertical-plate, said guide-plates being directionally transversely forwardly separated from the post member front-wall to provide in concert therewith laterally extending upright paneling channels, and iii. a web nonrotatable about the vertical-axis and slidably associated with said inner-face and said rearwardly convergent portions of the post internal-contour to internally brace and enhance the structural strength of the implanted post member, said web being attached to the vertical-plate, said web at the post header defining the majority of the cross-sectional shape of the wall stake header bore, the remainder of the bore cross-sectional shape being provided by the rearward portion of the tubular post member.

2. The wall stake of claim 1 wherein the tubular shape of the primary post member is non-rectangular and partially provided by a laterally extending vertical rear-wall having a laterally extending inward-face; and wherein the post member internal-contour is provided by the front-wall inner-face, the rear-wall inward-face, and two inside-faces respectively converging rearwardly from the front-wall to the laterlly narrower rear-wall.

3. The wall stake of claim 2 wherein the secondary member web includes a frontal-part slidably engaged with the tubular member front-plate inner-face and two wing-parts slidably engaged with the respective convergent inside-faces; and wherein the laterally extending width of the web frontal-part exceeds the the lateral width of the secondary member vertical-plate.

4. The wall stake of claim 3 wherein the vertical-plate of the secondary member is slidably engaged with the vertically slotted length of the primary member front-wall.

5. The wall stake of claim 2 wherein the web includes a frontal-part slidably engaged with the front-plate inner-face and also two wing-parts rearwardly diverging from the web frontal-part, the wing-parts being spaced remotely from the post member rear-wall inward-face and slidably engaged with remaining portions of the internal-contour whereby the cross-sectional shape of the header bore is defined by the two wing-parts and the frontal-part of the web and the inward-face of the rear-wall.

6. The wall stake of claim 5 wherein the primary member rear-wall has a substantially planar inward-face.

7. The wall stake of claim 6 wherein a tubular-sleeve is removably secured within the header bore.

8. The wall stake of claim 2 wherein the substantially co-elevational front-wall abutment-terminus and the vertical-plate lead-end are located below the primary member top-end and located nearer thereto than to the primary member bottom-end, the secondary member lower-end being located nearer the post member bottom-end than to the top-end thereof.

9. The wall stake of claim 8 wherein there are below the secondary member lower-end anti-spreading means for the primary member vertically slotted front-wall.

10. The wall stake of claim 2 wherein the front-wall slotted length commences at and extends downwardly from the post member top-end; and wherein the substantially co-elevational front-wall abutment-terminus and the vertical-plate lead-end are located below the primary member top-end and located nearer thereto than to the primary member bottom-end.

11. The wall stake of claim 10 wherein the secondary member lower-end is located below the front-wall abutment-terminous and located nearer thereto than to the post member bottom-end; and wherein there are stop means to maintain the secondary member lower-end below the post member top-end.

12. The wall stake of claim 2 wherein the primary member non-rectangular external-contour includes a rearwardly extending and laterally narrow protuberance of the rear-wall, said protuberance extending vertically as an upright rib which at the post member bottom-end is reduceable in cross-sectional size whereby the post member is implantable into relatively small vehicular pockets.

* * * * *